United States Patent [19]

Ziolo et al.

[11] Patent Number: 5,714,536
[45] Date of Patent: Feb. 3, 1998

US005714536A

[54] MAGNETIC NANOCOMPASS COMPOSITIONS AND PROCESSES FOR MAKING AND USING

[75] Inventors: Ronald F. Ziolo, Webster, N.Y.; Javier Tejada Palacios, Barcelona; Xixiang Zhang, Badalona, both of Spain

[73] Assignee: Xerox Corporation, Stamford, Conn.

[21] Appl. No.: 584,585

[22] Filed: Jan. 11, 1996

[51] Int. Cl.⁶ .................. C08J 5/10; C08K 3/18; C08K 3/22; C08L 33/08

[52] U.S. Cl. .............. 524/430; 524/439; 524/440; 524/441

[58] Field of Search .............. 524/430, 439, 524/440, 441, 431, 432, 433, 435, 492, 493, 377

[56] References Cited

U.S. PATENT DOCUMENTS

| | | | |
|---|---|---|---|
| 4,238,558 | 12/1980 | Ziolo | 430/108 |
| 4,474,866 | 10/1984 | Ziolo | 430/106.6 |
| 5,316,699 | 5/1994 | Ritter et al. | 252/584 |
| 5,322,756 | 6/1994 | Ziolo | 430/106.6 |
| 5,362,417 | 11/1994 | Ziolo | 252/314 |
| 5,431,967 | 7/1995 | Manthiram et al. | 427/555 |
| 5,567,564 | 10/1996 | Ziolo | 430/115 |

*Primary Examiner*—Vasu Jagannathan
*Assistant Examiner*—U. K. Rajguru
*Attorney, Agent, or Firm*—John L. Haack

[57] ABSTRACT

A magnetic composition comprising nanocomposite particles comprising from about 0.001 to about 60 weight percent of magnetic nanocrystalline particles dispersed in from about 40 to about 99.999 weight percent of a discrete phase matrix, and a continuous phase matrix, wherein the discrete phase resides in interstices within the continuous phase matrix.

25 Claims, 5 Drawing Sheets

MAGNETIC NANOCOMPASS COMPOSITIONS AND PROCESSES FOR MAKING AND USING

CROSS REFERENCE TO COPENDING APPLICATIONS AND RELATED PATENTS

Reference is made to commonly assigned copending applications: U.S. Ser. No. 08/178,540 (90063 I) filed Jan. 7, 1994, entitled "Magnetic and Nonmagnetic Particles and Fluid, Methods of Making and Methods of Using the Same", which discloses low optical density magnetic fluids for use in liquid development compositions and wherein a submicron particle size ion exchange resin may be selected to avoid further micronization or particle size reduction processing steps; U.S. Ser. No. 08/290,125 (D/93433) filed Jul. 15, 1994, entitled "Magnetic Nanocomposite Compositions and Processes for the Preparation and Use Thereof", which discloses a magnetic nanocomposite composition comprising from about 0.001 to about 60 weight percent of nanocrystalline particles of $Fe_3O_4$, and from about 40 to about 99.999 weight percent of a resin; U.S. Ser. No. 08/332,174 (D/94178) filed Nov. 31, 1994, entitled "Magnetized Pigments and Method and Apparatus for Producing Magnetized Pigments", which discloses a method and apparatus for producing magnetized pigments by forming a pigment coating on an external surface of a magnetic material core. The magnetized pigment is produced by forming a vaporized core of a magnetic material and forming the pigment coating on the magnetic material core; and U.S. Ser. No. 08/500,215 (D/94863) filed Jul. 10, 1995, entitled "Magnetic Refrigerant Compositions and Processes for Making and Using".

Attention is directed to commonly owned and assigned U.S. Pat. No. : 4,474,866, issued Oct. 2, 1984, entitled "Developer Compositions Containing Superparamagnetic Polymers" which discloses a developer composition containing superparamagnetic polymers; U.S. Pat. No. 5,322,756 (D/91331), issued Jun. 21, 1994, entitled "Expedient Method for the Preparation of Magnetic Fluids and other Stable Colloidal Systems"; U.S. Pat. No. 5,362,417 (D/90063), issued Nov. 8, 1994, entitled "Method of Preparing a Stable Colloid of Submicron Particles", which discloses submicron particles which are dispersible to form an aqueous colloid. Also disclosed is a method of forming the stable dispersion which includes providing an ion exchange resin, loading the ion exchange resin with an ion, and treating the loaded resin to form nanoscale particles. The resin and nanoparticles can be fluidizing to form an aqueous stable colloid. Also of interest is U.S. Pat. No. 5,358,659 (D/91332), issued Oct. 25, 1994, entitled "Magnetic Materials with Single-Domain and Multidomain Crystallites and a Method of Preparation"; and U.S. Pat. No. 4,457,523, issued Oct. 10, 1995, entitled "Ferrofluid Media Charging of Photoreceptors".

The disclosures of each of the aforementioned copending applications and patents are totally incorporated herein by reference.

BACKGROUND OF THE INVENTION

The present invention relates to nanomagnetic compositions and the use thereof in magnetic compositions, articles, and processes. More particularly, the present invention relates to nanomagnetic compositions and to processes for making and using in, for example, nanocompass and navigational articles and devices, alternating current transformers, and related applications. The present invention provides magnetic compositions comprising rotationally free, single domain, nanomagnetic composites.

The compositions of the present invention are useful in a variety of magnetically responsive systems, applications, and devices including, for example, as electrical transformer compositions and devices particularly at high electric field frequencies, magnetic gyroscopy and related navigational applications, for example, two and three dimensional compasses, optical communications, switching devices and systems, electromagnetic radiation generators and sensors, transducers, electromotive force (EMF) shielding applications, and the like.

The present invention also relates to processes for preparing magnetic compositions having substantially only rotationally free, single domain magnetic particles. More particularly, the present invention relates to magnetic compositions possessing novel magnetic properties including: being free of barriers to a change in system magnetization (M); having substantially no magnetic memory or hysteresis; having high initial magnetic permeability; wherein the magnetic response of the composition becomes infinite up to about the saturation magnetization of the composition upon application of a magnetic field (H); temperature and magnetic field dependent magnetic properties; solid-liquid phase dependent reversible superparamagnetic to paramagnetic properties; low magnetic resistivity; electrically insulating; and exceptionally high resistance to quantum tunneling above about 0° K.

The term "domain" is described, for example, in C. P. Bean and J. D. Livingston, *J. Appl. Physics*, 30, 120 (1959); and B. D. Cullity. *Introduction to Magnetic Materials*, Addison-Wesley Publishing Co., Massachsetts, (1972), see also *The Magnetic Properties of Materials*, by J. E. Thompson, Newnes International Monographs on Materials Science and Technology, CRC Press, Cleveland. Ohio, 1968, which are incorporated herein by reference in their entirety, and refers in embodiments of the present invention to single domain particles, for example, discrete magnetically isolated and non interacting superparamagnetic nanoparticles. Although not wanting to be limited by theory, it is believed that the presence of substantially or exclusively single-domain crystallites in the compositions of the present invention enable the aforementioned combination of novel magnetic properties and applications thereof.

The present invention also relates to methods for forming and manipulating the magnetic properties of isolated nanocompass particles, for example, the size or dimensions of the single domain may be controlled to a great extent by the strength and duration of an externally applied pulsed electromagnetic field that is used to "carve" or etch individual domains, interstices or cavities within a continuous solid or gel phase.

A magnetic nanocompass composition and method as used herein refers to measuring the attitude and position of the magnetic composition before and after orienting the magnetic moments of the magnetic single-domain crystallites or nanoparticles and thereafter determining the relative magnetic changes with respect to reference coordinates thereby providing a three-dimensional compass composition and compass means as illustrated herein.

Properties of magnetic fluids are disclosed, for example, in *Magnetic Fluids Guidebook: Properties and Applications*, V. E. Fertman, Hemisphere Publishing Corp., New York, 1990, the disclosure of which is incorporated herein by reference in its entirety. The magnetic properties of magnetic fluids as a function of temperature have been extensively studied. For example, for conventional ferromagnetic or ferrimagnetic single-domain particles spontaneous magnetization disappears at a certain temperature known as the Curie point($T_c$), also known as the magnetic transition temperature. At the Curie point, the exchange atom interaction energy is equal to the thermal interaction energy, and the substance becomes paramagnetic. The upper Curie point is the temperature above which ferroelectric materials lose their polarization and the lower Curie point is the temperature below which some ferroelectric materials lose their polarization. When ferromagnetic materials become paramagnetic at the Curie point the material exhibits the so-called Curie-Weiss effect or behavior.

The following United States patents are noted as being of interest to the background of the present invention.

U.S. Pat. No. 5,316,699, issued May 31, 1994, to Ritter, Shull, et al., discloses a chemical process for producing bulk quantities of an iron-silica gel composite in which particle size, form, and magnetic state of the iron can be selected. The process involves polymerizing an ethanolic solution of tetraethylorthosilcate, with ferric nitrate present in water at low temperature under the influence of an HF catalyst. The chemical and magnetic states of the iron in the resultant composite are modified in situ by exposure to suitable oxidizing or reducing agent at temperatures under 400° C. Iron-containing particles of less than 200 Angstroms diameter, homogeneously dispersed in silica matrices may be prepared in paramagnetic, superparamagetic, ferrimagnetic and ferromagnetic states.

U.S. Pat. No. 4,238,558, discloses low density magnetic polymeric carrier materials containing a polymer material impregnated with a magnetic elemental metal or metal oxide derived from transition metal carbonyl compounds. According to the disclosure of this patent, the carrier particles are prepared by placing in a suitable vessel particles of a polymeric material, a suspending medium, and a transition metal carbonyl, heating the mixture with agitation for the purpose of thermally decomposing the transition metal carbonyl, causing the polymer to be impregnated with a magnetic elemental metal or metal oxide of a transition metal carbonyl, followed by cooling.

The disclosures of each of the aforementioned documents are totally incorporated herein by reference.

U.S. Pat. No. 5,358,659 (D/91332) assigned to the assignee of the present application, and which is incorporated herein by reference in its entirety, discloses a method of forming magnetic materials having tunable magnetic properties and the magnetic materials formed thereby. The magnetic materials contain both single-domain and multi-domain particles and have high initial permeability while maintaining coercivity and remanence in the material. A method for making a magnetic ferrofluid comprises providing a colloidal suspension of submicron ion exchange resin matrix, loading the resin matrix by ultrafiltration with a magnetic ion, precipitating single-domain particles within said resin and precipitating multidomain particles outside of the resin to form a stable colloidal dispersion of the resin and particles.

In the aforementioned commonly assigned U.S. Pat. No. 5,362,417 (D/90063) there is disclosed a method of forming a colloidal dispersion of submicron particles comprising: providing an ion exchange resin matrix; loading said resin matrix with an ion; and treating the resin to cause in-situ formation of submicron particles; and fluidizing said ion exchange resin and particles in an aqueous medium to form a stable colloid of the particles.

U.S. Pat. No. 4,474,866, assigned to the assignee of the present application, discloses a developer composition containing superparamagnetic polymers. The developer composition disclosed in this patent consists of a dispersion of fine particles of iron oxide in a polystyrene ion exchange resin. More specifically, the developer composition consists of $\gamma$-$Fe_2O_3$ (gamma) disposed in a sulfonated divinylbenzene cross-linked polystyrene resin.

In the aforementioned commonly assigned copending application U.S. Ser. No. 08/332,174 (D/94178) is disclosed a method for producing a magnetized pigment comprising the steps of: forming a magnetic material core in a vaporized state from a vaporized magnetic material; and forming a pigment coating on the magnetic material core while in the vaporized state.

The disclosures of each of the aforementioned commonly assigned documents are totally incorporated herein by reference.

There exists a need for nanomagnetic compositions, articles, devices, and systems that are suitable for use at temperatures, for example, from about 100° K to about 300° K and above.

There remains a need for nanomagnetic materials which can be used in microscopic magnetic processes and applications. There also remains a need for magnetic materials which are single domain and rotationally free at temperatures of about 10° K and above.

Still further, there is a need for nanocrystalline nanocomposite particles that permit low cost, clean, and optionally dry micron and submicron polymeric composite particles that can be selected for use in a magnetic liquid or solid formulation, and utilized as an active component in magnetic fluids, gels and solids.

Another problem in the field of magnetic materials has been the absence of rotationally free, single domain, superparamagnetic and paramagnetic compositions and processes for making and using.

Solutions to the above problems and needs have been unexpectedly found in the compositions and processes of the present invention wherein there is provided superior magnetic materials that enable, for example, nanomagnetic articles, devices and processes, for example, wherein the individual magnetic moments contained in the nanomagnetic crystalline species are freely rotating, single domain, and therefore easily and independently oriented in low, intermediate, and high magnetic fields.

A long standing problem in the area of nanomaterials and nanotechnology has been the absence of nanoscale magnetic materials which possess the necessary combination of magnetic properties to be suitable for use in, for example, navigational, and the like devices. In embodiments of the present invention, solutions to the aforementioned problem are provided.

SUMMARY OF THE INVENTION

Examples of objects of the present invention include:
overcoming or minimizing problems encountered in the art and providing magnetic compositions which are substantially rotationally free and single domain;
providing processes for readily and economically preparing and stabilizing nano- and mesoscopic sized magnetic compositions which are substantially rotationally free and single domain;
providing magnetic compositions which are adaptable for use in two and three dimensional compass devices and which devices are suitable for use in navigational and orientational applications, particularly on micron, submicron and below, dimensional situations, for example, in a semiconductor device;

providing magnetic compositions which are electrically insulating and are adaptable for use in high field alternating current transformer devices wherein high energy conversion efficiency is achieved;

providing magnetic compositions which can be characterized as smart materials in that they are capable of reacting intelligently by, for example, responding to the immediate magnetic environment, for example, as manifested by changes in the orientation, motion such as in an accelerometer, or temperature, of the composition; and providing magnetic permeability sensing processes which processes are useful in, for example, navigational and orientational devices.

These and other objects are achieved, in embodiments, of the present invention as described and illustrated herein.

BRIEF DESCRIPTION OF THE DRAWINGS

The above and further objects and advantages of the present invention will be readily apparent from the following description of preferred embodiments taken in conjunction with the accompanying drawings.

DETAILED DESCRIPTION OF THE INVENTION

Figure 1A:
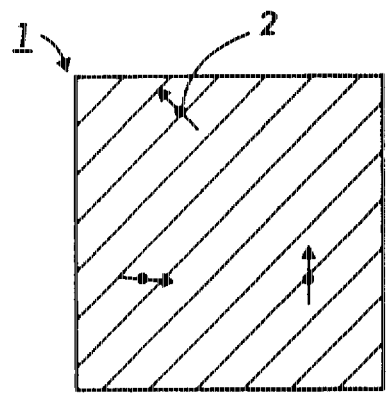
FIG. 1a is a schematic illustration of randomly oriented magnetic dipoles of a magnetic material dispersed in a liquid matrix.

The present invention provides, in embodiments, magnetic compositions suitable for use in magnetic processes and nanocompass application which exhibit unexpected and superior magnetic properties compared to those known in the art. The properties of the nanomagnet compositions of the present invention enable improved magnetic processes, for example, at about 4° K and above, and which improvements are greater than would have been predicted based solely upon considerations of the chemical composition and magnetically active material content. Although not wanting to be limited by theory, it appears that the unexpected magnetic compositions and processes of the present invention are attributable in large part to the nanoscopic size, noninteracting uniform distribution, and rotationally free disposition of the magnetic species within the ionic exchange matrix, and that the magnetic compositions have a Curie temperature on the order of about 100° to about 400° K.

In embodiments of the present invention, there are provided magnetic compositions comprising nanocomposite particles comprising from about 0.001 to about 60 weight percent of magnetic nanocrystalline particles dispersed in from about 40 to about 99.999 weight percent of a discrete phase matrix, and a continuous phase matrix, wherein the discrete phase resides in interstices within the continuous phase matrix. The rotationally free magnetic component of the dispersed or discontinuous phase is believed to have a nominal domain diameter of from about 10 to about 100 nanometers, and an expected domain volume of about 1,000 to about 1,000,000 cubic nanometers.

Although not wanting to be limited by theory it is believed that the magnetic nanocrystalline particles and discrete phase are contained or substantially encapsulated within interstices or a void or voids between the discrete phase matrix and the continuous phase matrix. The magnetic nanocrystalline particles are believed to be mechanically and magnetically rotationally free and single domain in character as illustrated herein, reference the figures and the working examples. The magnetic nanocrystalline particles are also believed to be completely or substantially free of magnetic memory as is the bulk magnetic composition.

The terms "dispersed phase" and "discrete phase" as used herein can be used interchangeably and refer to the discontinuous phase of the composition which contains the magnetic nanocrystalline particles and the discrete phase matrix, for example, an intimate or mesoscopic dispersion of magnetic nanocrystalline particles dispersed in an ion exchange resin as disclosed in U.S. Pat. No. 4,474,866, to Ziolo, and the aforementioned copending application U.S. Ser. No. 08/290,125 (D/93433).

The magnetic nanocrystalline particles are magnetic particles selected from the group of magnetic materials such as metal oxides, elemental metals, and mixtures thereof, and are readily prepared, reference the aforementioned U.S. Pat. No. 4,474,866, to Ziolo, copending, application U.S. Ser. No. 08/290,125 (D/93433); and U.S. Pat. No. 4,238,558 wherein polymer materials are impregnated with a magnetic metal oxide, and elemental metal derived from transition metal carbonyl compounds, respectively. The magnetic nanocrystalline particles are, in embodiments, from about 0.001 to about 0.1 microns in diameter.

The discrete phase matrice functions as a binder and stabilizing entity for the formation and retention of the magnetic nanocrystalline particles from the appropriate precursor materials. The discrete phase matrix can be any suitable organic or inorganic binder material, such as thermoplastic or thermoset resins, ion exchange resins, ion exchange metal oxides, such as silicon dioxide, which is capable of hosting the magnetic nanocrystalline particles. Other examples of materials useful for the dispersed phase include ion exchangeable polymer resins such as sulfonated polystyrene resins and perfluorinated polysulfonic acid containing resins, and wherein the polymer resin is optionally crosslinked. The dispersed phase matrix can be an inorganic ion exchangeable metal oxide or mixed metal oxide compounds. When the dispersed phase selected is an oriented structure, such as mica or sulfonated graphite, a two dimensional nanomagnetic composition can be formed. Similarly, when a three dimensionally structured material is selected for the dispersed phase, such as, silica or sulfonated ion exchange resins, a three dimensional nanomagnetic composition results.

According to embodiments of the present invention, a crosslinked polymer resin matrix having chemically addressable sites is used to prepare nanomagnetic composites and serves as the discrete phase matrix in magnetic compositions of the present invention. Such a matrix is provided by, for example, an ion exchange resin. The majority of organic ion exchange resins are based upon a matrix of crosslinked polystyrene which provides a chemically and physically robust micro structure of the type needed to produce the fine particulate nanocomposite. A preferred resin is a polystyrene sulfonic acid (PSSA) ion exchange resin crosslinked at from about 1 to 16% with divinylbenzene. More preferably, a 2 to 8% divinylbenzene crosslinked sulfonated polystyrene can be selected. Illustrative examples of suitable ion exchange resins include those polymers possessing chemically addressable sites dispersed throughout their matrix, or on their surface, and which sites can be used to generate an ionic component in situ. Specific examples of these resins include sulfonated and carboxylated polystyrenes, strongly acidic polyphenolics, polysulfonic acids prepared from monomers of the formula R—$CH_2$—$SO_3$—H+, weakly acidic polyacrylics with a pH of about, for example, 5 to 6, for example, polycarboxylic salts prepared from unsaturated monomers of the formula R—COO—Na+, wherein R is a polymerizable monomer with from 2 to about 20 carbon atoms, for example, unsaturated alkyl, alkylene, alkyne, arylalkylene or arylalkyl groups, perfluorinated polysulfonic acids, weakly acidic chelating polystyrenes, and the like, with strongly acidic sulfonated polystyrenes and perfluorinated polysulfonic acid salts being preferred. In addition, anionic exchange resins such as Baker IONAC NA-38, Baker IONAC A-554, Dowex SBR, AMBERLITE IRA-400, AMBERLYST, Dowex IX8-100, and NAFION® resins available from DuPont, may also be used. Other suitable resins can be selected by one of ordinary skill in the art provided that they are compatible with the ion exchangeable resin or resins selected and providing they achieve the objectives of the present invention.

The resin selected for the discrete phase matrix is preferably capable of withstanding, during preparation and processing and in various magnetic process applications, repeated cycles of drying, gelling, swelling, and de-swelling, and preferably, will not decompose thermally below about 120° C., and more specifically, from about 120° C. to about 150° C. The resin is preferably chemically unaffected by exposure to strong acids, bases or redox solutions with the exceptions of undergoing the desired ion exchange reactions. The resin may be of an analytical or an industrial grade. Aside from differences in cost and size, the industrial grade resins typically have more color than the analytical grades. Most of the color associated with industrial grade resins is temporary and is easily removed if desired by solvent washing, usually with water or alcohol or mixtures thereof. After washing, the industrial grade resin may retain a weak amber color similar to the analytical grade. Resin beads may be in embodiments, from about 20 to about 500 mesh and are preferably from about 20 to about 400 mesh size or between about 850 and about 38 microns. More preferably, the resin beads are from about 200 to about 400 mesh or between about 75 and 38 microns. The larger size beads have two advantages over the smaller beads. First, the processing time is shorter when using the larger beads due to faster settling rates and ease of decanting. Second, the larger beads are mechanically weaker than the smaller bead due to greater osmotic shock effects during their manufacture. Thus, nanocomposite magnetic material prepared from the larger beads crushes and presumably micronizes more easily than those made from the smaller beads. Despite its weaker mechanical strength, the lower cost larger resin retains its ion-exchange capability through and even beyond ten-cycles of loading with the magnetic metal precursors of elemental metal species. The smaller sized ion exchange matrix particles have the advantage of being more readily dispersible in a liquid vehicle, for example, the continuous phase prior to solidlying, without the need for additional particle size reduction processing steps. Commercial ion exchange resins for use in the present invention include polystyrene sulfonic acid ion exchange resins which may be obtained from such manufacturers as Rohm and Haas, DuPont, and Dow Chemical.

Once a resin is selected, the resin matrix is next loaded with the desired precipitate precursor magnetic ion, ions, or metal atom clusters. If a magnetic colloid is selected, this may include several different magnetic ions including, for example, ferrous or ferric ions in a manner described in the aforementioned U.S. Pat. No. 4,474,866 to Ziolo.

The magnetic ion loaded resin is thereafter treated so as to cause an in-situ precipitation of the magnetic material desired for dispersion. Gamma-$Fe_2O_3$ and $Fe_3O_4$, for example, may be precipitated in this manner. The nanometer size metal ion containing particles may be precipitated as compounds, for example, as iron sulfide clusters, in their elemental forms, or preferably as the metal oxides, reference for example, the aforementioned commonly assigned copending application U.S. Ser. No. 08/290,125 (D/93433), and which particles are preferably selected based on an empirical determination of their respective nanomagnetic properties. The nanomagnetic particles are, in embodiments, from about 1 to about 100 nanometers in mean particle diameter, preferably from about 1 to about 50 nanometers, and more preferably from about 5 to about 10 nanometers in diameter.

The nanomagnetic composite resin beads prepared as described above may be dried prior to micronization and then subsequently micronized to produce a dry powder composite for dispersion in a continuous phase, such as a fluid or solid, for example, a non-dissolving liquid dispersion media like alcohol or a polymer. This dispersion of crushed nanomagnetic composite and fluid or solid may subsequently be used to prepare the magnetic composition formulation as illustrated herein.

The continuous phase matrix can be a solid, a gel, or a foam, and is preferably sufficiently viscous to prevent diffusion of the discrete phase matrix within the continuous phase matrix. Thus, in embodiments, the continuous phase matrix can be a solid, a solidifiable, or a gellable material, and can include freezable liquids including water, and organic solvents, such as an alcohol or mixture of alcohols, especially aliphatic alcohols such as methanol, ethanol, and the like, with from 1 to about 5 carbon atoms at a temperature at or below the freezing point of the alcohol; gellable compositions including surfactants, polymers and metal oxides; polmerizable monomer compounds; rigid foams such as polyurethane foam; and the like materials known to those of ordinary skill in the art.

The continuous phase matrix can, in embodiments, be a gel comprised of a mixture of a glycol and hydrophilic fumed metal oxide particle, for example, a mixture of ethylene gylcol and AEROSIL 300® a hydrophilic silica, available from Degussa A. G,. readily forms suitable gel compositions when mixed in various portions. The gellation of these mixtures is believed to be attributable to extensive crosslinking of the silica particles by the glycol through hydrogen bonding phenomena.

The continuous phase matrix can, in embodiments, be a solid alkyl acrylate polymer, for example, obtained by photochemically polymerizing alkyl acrylate monomers at lower temperatures, using the known acrylate polymer isolation technique, prior to or during the formation and generation of the rotationally free magnetic particles.

In still other embodiments, the continuous phase matrix can be a gelled acrylic polymer, such as CARBOPOL™ polymers available from CABOT Corporation, and which gelling is readily affected by physical means, such as adding or removing solvent, or by chemical means, such as changing pH with, for example, alkali or ammonia. Another example is an ionically conductive gel compound of 4 weight percent acrylic acid neutralized with NaOH containing 96 weight percent water.

The aforementioned interstices, although not wanting to be limited by theory, are believed to possess a multiplicity of voids within the continuous phase matrix which may form when the solid composition is exposed to a pulsed magnetic field. Interstices are believed to be substantially spherical in shape and from about 0.001 to about 1.0 micron in diameter, and preferably from about 0.005 to about 0.1 microns in diameter.

Compositions of the present invention are believed to be substantially or entirely free of magnetic interaction between neighboring magnetic hang crystalline particles, and adjacent discrete phase matrix particles. That is, the nanocrystalline particles residing within the individual discrete phase matrix particles are substantially or completely isolated from other discrete phase matrix particles and there exists substantially no interparticle interaction, for example, physically or magnetically. Thus, compositions of the present invention are substantially free of barriers to changes in system magnetization(M). Consequently, the magnetic response of the compositions is infinite up to about the saturation magnetization of the composition upon application of a magnetic field (H) of from about $10^{-8}$ to about 10 Tesla. In embodiments, the initial magnetic saturation of the composition is from about 0.01 emu per gram to about the bulk saturation magnetization of the composition. In other embodiments, for example, when the compositions are formulated with a discrete phase in an amount of from about 0.1 to about 20 weight percent, and preferably from about 1.0 to about 10 weight percent, with respect to combined weight of the discrete phase and continuous phase the compositions can have a magnetic saturation moment of 0.1 to about 30 emu per gram.

The compositions of the present invention can have an initial magnetic permeability (a dimensionless quantity) of greater than about 1.0 and more specifically, from about 1.1 to about $10^7$.

In embodiments, the compositions of the present invention are electrically nonconductive. However, the compositions if desired can in embodiments be made electrically conductive without compromising the magnetic properties of the composition or of the discrete phase particles by inclusion of small amounts of known conductive salts into, for example, a composition wherein continuous phase is comprised of a gel, as mentioned above, which allows for the electrical diffusion of ions within the continuous phase gel but precludes the migration or mobility of considerably larger sized and smaller charge density discrete phase particles.

The compositions of the present invention, in embodiments, are superparamagnetic at above about 4° K to about 500° K and are instantaneously responsive to a magnetic field so long as the integrity of the continuous matrix is maintained. Thus, when the isolation and separation of individual or neighboring discrete phase particles is preserved, as for example, when the continuous phase retains solid, gel, or rigid foam phase characteristics which preclude discrete phase particle diffusion, the superparamagnetic behavior persists indefinitely.

For at least these reasons, although not wanting to be limited by theory, it is believed that the compositions of the present invention are, substantially free of quantum tunneling of magnetization above 0° K.

The magnetic nanocrystalline particles residing within the discrete or disperse phase particles can, in embodiments, be formed from magnetic metal ions selected from the group consisting of transition metal elements, such as iron, nickel and cobalt, a lanthanide series element, such as platinum, gold and mercury, and mixtures thereof. In preferred embodiments, the magnetic nanocrystalline particles are nanoscopic or mesoscopic in size, and are comprised of gamma phase iron oxide particles uniformly dispersed in the discrete phase. In other embodiments of the present invention, the magnetic compositions can include, in addition to the aforementioned superparamagnetic particles, magnetic nanoparticulate particles selected from the group consisting of ferro-, ferri-, and mixtures thereof, that is, non-superparamagnetic particles.

In embodiments, the nanocrystalline particles contained in the discrete phase, and the discrete phase particles themselves are both physically separated from the walls of the interstices formed by and within the continuous phase matrix. The interstices, although not wanting to be limited by theory, are believed to be voids or vacuoles which are formed by, or result from the action of a magnetic field upon the isolated magnetic discrete phase particles in a solid, foam, or gelled continuous phase matrix as illustrated herein. The interstices can, in embodiments, be vacuum or filled with ambient atmosphere, such as an inert gas or air, depending upon the gas diffusion and gas permeability properties of the surrounding continuous matrix.

The present invention provides, in embodiments, processes for preparing a magnetic composition comprising: providing a magnetic nanocomposite comprising from about 0.001 to about 60 weight percent of magnetic nanocrystalline particles residing within from about 40 to about 99.999 weight percent of a discrete phase to form a dispersed phase matrix; optionally grinding the nanocomposite; optionally drying the nanocomposite; dispersing the resulting dispersed phase matrix in a continuous phase and thereafter solidifying the resulting mixture by, for example, freezing, gelling, polymerizing, and the like methods, to form a thermally, mechanically, and magnetically stable and uniform dispersion of the discrete phase matrix, for example, in the form of submicron sized particles, in the continuous phase matrix;

and applying a magnetic field to the resulting stable mixture to form interstices or voids between the dispersed phase matrix particles and the continuous phase matrix and wherein the dispersed phase matrix particles are physically separated from the walls of the interstices within the continuous phase matrix thereby providing a collection of discrete, rotationally free single domain magnetic particles.

The aforementioned magnetic field, in embodiments, is preferably a singly or continuously pulsed magnetic field. The strength of the magnetic field can, in embodiments, be, for example, from about 0.002 to about 1 Tesla. The magnetic field used to magnetize the magnet compositions can be provided by known magnetic devices, for example, a refrigerated electromagnet, a superconducting magnet, a switchable on/off electromagnet, a non-refrigerated electromagnet, and a permanent magnet or magnets, or combinations thereof. A pulsed or inverting magnetic field is preferred in embodiments. The nanomagnetic compositions obtained in accordance with the present invention can be used in a variety of ancillary magnetic devices and processes with magnetic field strengths of less than about 10 Tesla. The nanomagnetic compositions of the present invention are compositionally robust and quite stable to, for example, extensive magnetic pulsing or thermal cycling, for example, in excess of several million cycles, when the compositions are maintained in the aforespecificed non-diffusing non interacting solid, foam, or gel states.

Suitable discrete phase and continuous phase matrices useful in the preparative process are as defined above. In embodiments of the present invention, depending upon the continuous phase matrix selected, for example, organic solvents or surfactants with melting points or gel points below or in the range of from about 0° to about 50° C., the magnetic composition can exhibit thixotropic properties at from about 0° to about 50° C.

In embodiments of the present invention, the rotationally free single domain magnetic properties of the magnetic compositions can disappear when the continuous matrix is converted from a solid, foam, or gel to a free flowing liquid. The rotationally free single domain magnetic properties of the magnetic compositions can reappear when the continuous matrix is reconverted or reconstituted from a liquid back to a solid or gel. Thus, the rotationally free single domain magnetic properties of the nanomagnetic composites of the present invention appear to be reversible and depend in part upon the mobility and the degree of dispersion of the discrete phase within the continuous phase.

Although not wanting to be limited by theory, it is believed that the magnetic composites of the present invention are free from magnetic relaxation phenomena when an external magnetic field surrounding or acting on the magnetic compositions is varied. The presence of this physical phenomena enables several important applications, such as magnetic permeability sensing processes, navigational devices and processes as illustrated herein.

In embodiments, there is provided a magnetic permeability sensing process comprising: providing magnetic composition comprising nanocomposite particles comprising from about 0.001 to about 60 weight percent of magnetic nanocrystalline particles residing within from about 40 to about 99.999 weight percent of a discrete phase matrix, and preferably from about 0.01 to about 40 weight percent nanocrystalline particles residing in from about 60 to about 99 weight percent of a discrete matrix, and a continuous phase matrix in an amount of from about 4 to about 99.9 weight percent, and preferably from about 10 to about 90 weight percent, of the total composition, wherein the magnetic nanocrystalline particles and discrete phase are contained, or substantially encapsulated, within a void or voids between the discrete phase matrix and the continuous phase matrix, and wherein the magnetic moments of the nanocrystalline particles of the magnetic composite are oriented relative to the continuous matrix by an ambient or applied magnetic field, for example the earth's magnetic field; measuring the initial attitude and position of the oriented magnetic moments of the nanocrystalline particles by applying a sensing electromagnetic field; repositioning the magnetic composition relative to the ambient or applied magnetic field; measuring the final attitude and position of the oriented magnetic moments of the nanocrystalline particles resulting from repositioning the magnetic composition by reapplying the sensing electromagnetic field; and calculating or determining the relative change or difference in the attitude and position resulting from repositioning the magnetic composition with respect to a reference coordinate. The aforementioned ambient or sensing electromagnetic fields are independently generated by, for example, electrical currents, sound waves, gravity, mechanical motion, applied magnetic fields, geomagnetic fields, biomagnetic fields, and combinations thereof. The measurement of the relative change in the attitude and position can be accomplished by various ways known to one of ordinary skill in the art, for example, electrically, magnetically, acoustically, and the like methods, and wherein the immediate orientational history of the magnetic composite with respect to the ambient or reference applied magnetic field is indicated. The aforementioned magnetic permeability sensing process can be incorporated into a variety of sensing devices, such as the aforementioned two and three dimensional compasses, an electronic gyroscope, and the like devices.

Magnetic compositions of the present invention can be characterized, in embodiments, as "smart materials" in that the compositions are capable of reacting intelligently, for example, by responding to the immediate magnetic environment, for example, as manifested by changes in the orientation, motion, or temperature, of the composition. The magnetic compositions of the present invention provide magnetic materials with high initial and long lived magnetic permeability.

Rotationally free, single domain nanomagnet compositions and processes for making and using, as disclosed in the present invention, can be achieved by one of ordinary skill in the art upon comprehending the teachings herein and in commonly owned and assigned U.S. Pat. No. 5,358,659 and copending application U.S. Ser. No. 08/500,125 (D/94863), the disclosures of which are incorporated herein in their entirety, which provide for forming magnetic nanocomposites, for example, by providing an ion exchange matrix; loading the matrix with an ion capable of forming a magnetic phase; treating the loaded matrix to cause in situ formation of magnetic particles or magnetic nanoclusters, and optionally isolating and sizing the nanocomposite particles as desired; dispersing the resulting nanocomposite particles comprising a discrete or discontinuous phase in a suitable continuous matrix; and solidifying the continuous matrix.

In embodiments of the present invention, the liquid medium or liquid vehicle provides a suitable dispersion and solidification medium for the nanocomposite therein, and optionally if desired a gel forming component. A variety of liquids or liquid mixtures may be selected as a suitable liquid media. Upon cooling the mixture comprised of the nanocomposite dispersed in the liquid media to below about 200° to about 400° K, a solid or gelatinous matrix results. Preferably, the liquid or mixture of liquids does not dissolve or solubilize the nanocomposite particles or the ion exchange matrix to any extent, nor is the liquid media substantially physically or chemically altered by the application of a magnetic field. Examples of suitable liquids include water, alcohols, polyols, glycols, glycol ethers, ethers, and liquid metals, such as mercury, gallium, and mixtures thereof. Thus, in embodiments, the magnetic composition may be formulated in pure methanol, or alternatively, in a mixture of alcohols. The liquid media in admixture with the nanomagnetic composite preferably forms a rigid solid, gel, or foam when cooled to below about 300° K, or when induced by, for example, chemical, photochemical, and the like means, for effecting the aforementioned phase transition.

Although not wanting to be limited by theory it is believed that the aforementioned magnetic nanocrystalline particles are initially, physically and or chemically, bonded to the ion exchange matrix comprising the host or discrete matrix and uniformly dispersed therein, as disclosed in the aforementioned commonly assigned U.S. Patents and copending applications. Upon exposure of the subsequently solidified cooled liquid or gelled nanocomposite dispersion, to an applied magnetic field, and preferably a pulsed magnetic field, the nanocrystalline particles become partially or entirely physically disassociated from the cooled or solidified matrix while remaining compartmentalized within the cooled or solidified matrix and thereby become apparently freely rotating, single domain nanomagnetic particles in accordance with the measured physical properties as illustrated herein. Thus, the aforementioned applied magnetic field pulse "snaps" or separates the magnetic nanocrystalline particles free from direct physical or chemical association with the ion exchange matrix so that the nanocrystalline particles are free to mechanically rotate or orient in a suitable magnetic field of relatively low strength at temperatures between 0° and 300° K, and in preferred embodiments, at temperatures above about 300° K. The separated particles rotate freely in response to applied magnetic fields at least as low as 0.001 Tesla. Initially, when the nanocomposite or discrete matrix is dispersed in the liquid medium, for example, at room temperature, the magnetic spin moments of the magnetic nanocomposites are substantially randomly oriented. Upon cooling the gelled matrix, but prior to application of an external magnetic field, the magnetically active particles reside upon the walls of hollows or cavities formed within the solid or gelled matrix upon cooling to low temperatures, for example, below about 10° to about 200° K. Upon application of a suitable magnetic field of from about 0.2 to about 1 Tesla, or upon sudden reversal of the direction of the magnetic field, the magnetic nanocomposite particles separate from the continuous matrix comprised of the solid or gel medium and remain isolated, that is magnetically non-interacting. In the isolated state, the nanocomposite particles exhibits Curie-Weiss behavior and are free of magnetic hysteresis, and which observations are consistent with a large collection of rationally free, independent nanomagnets. Thus, the rotationally free magnetic composites of the present invention provide nanocompass particles suitable for use in the aforementioned applications and processes.

Magnetic compositions of the present invention are differentiated from known magnetic compositions in that they exhibit the aforementioned combined magnetic properties.

The magnetic compositions of the present can, in embodiments, include optional additives, such as additives to control or enhance the magnetic, flow, and performance properties and utility of the resulting formulated composition, such as colorants, security taggants, radiographic-labels, contamination or wear indicators, fragrance or odorants, corrosion inhibitors, humectants, viscosity improvers, and the like. The aforementioned optional additives can be used in any suitable quantity so long as the magnetic properties and integrity of the magnetic composition are not compromised.

Nanomagnetic nanocrystalline metal oxide or elemental metal particles of the present invention can be formed from for example, magnetic metal ions such as transition metal elements, such as iron, nickel, manganese, a lanthanide series element, and mixtures thereof, using preparative techniques and methodologies, for example, as disclosed in the aforementioned commonly owned and assigned issued U.S. Patents and copending applications, and as illustrated herein.

In embodiments of the present invention, the nanomagnetic compositions may be cooled by conventional mechanical, chemical and physical refrigeration means known to one of ordinary skill in the art.

A preferred nanomagnetic composition in embodiments of the present invention, comprises a nanocomposite comprising a nano-scale gamma phase iron oxide particles highly dispersed in an ion exchange polymer resin or inorganic ion exchange compound. The nanomagnetic composition, in embodiments, is readily dispersed, and thereafter spontaneously gelled, in a liquid vehicle, for example, an alcohol mixture, using known mechanical mixing equipment, separate from or in conjunction with the aforementioned refrigeration means.

The magnetic composites of the present invention include submicron magnetically susceptible solid nanocomposite particles dispersed in a compatible liquid medium, and submicron nanomagnetically susceptible solid nanocomposite particles dispersed in a compatible solid. The compatible solid can be selected from known materials, such as a frozen or gelled liquid, binder resins other than the aforementioned ion exchange resins, rubbers, cellulosics, glasses, and the like solid vehicles. The solid vehicles are preferably friable under mederate to high or intense shear using mechanical means, such as roll and shot milling, while the solid vehicles are preferably resistant to degradation under the relatively low shear situation associated with the gelling and dispersion conditions.

Useful ion exchange polymer resins include sulfonated polystyrene resins, optionally crosslinked with, for example, divinyl benzene, and perfluorinated polysulfonic acid containing resins. Alternatively, the ion exchange matrix selected can be inorganic ion exchangeable metal oxide and mixed metal oxide compound or compounds, for example, known natural and synthetic zeolites and molecular sieves, and inorganic layered compounds, such as hydrotalcites and mica, and mixtures thereof.

The ionic exchange matrix selected is preferably an organic ion exchange resin which provides a polymeric dispersion support matrix and nucleation sites during the formation of the magnetic nanocrystalline particles.

Once the nanomagnetic composite material has been formed, the ion exchange process and subsequent formation of particles may then be repeated several times to achieve higher loading of magnetic species in the composite particles. As the number of particles increases or their size increases the crosslinked ion-exchange polymer matrix becomes stressed and eventually ruptures. In a typical ion exchange resin, sufficient stress may occur after the first loading. Rupture of the composite particles may be easily detected for example, texturally, visually or microscopically.

Micronization, by for example, ball-milling of the composite product in a stable liquid or solid medium or vehicle will lead to the formation of the stable dispersion of the nanomagnetic composite material in about 30 to about 180 minutes. A suitable vehicle is any vehicle which allows dispersion including, for example, alcohols and alcohol miscible liquids and the like solvents, such as methanol and ethylene glycol. Examples of suitable liquid vehicles include known liquids including water, alcohols, polyols, glycols, glycol ethers, ethers, and liquid metals, such as mercury, gallium, and mixtures thereof. Thus, in embodiments, the nanomagnetic compositions may be formulated in, for example, methanol, or alternatively, a mixture of methanol and other miscible alcohols. The liquid medium may further include any liquid material which does not adversely effect the desired magnetic, mechanical, electrical or optical properties of the nanomagnetic composition or performance of the composition in various magnetic process applications, for example, alcohol soluble or miscible polymers or surfactants.

Micronization refers to the formation of a liquid or solid mixture through mechanical comminution of the polymeric or inorganic matrix particles containing the discrete nanocrystalline nanomagnetic particles. Micronization may be accomplished by attrition, air attrition followed by dispersion in alcohol, shaking, milling, ball milling, shaking or ball milling directly in alcohol, or the like media. Shaking or ball milling are generally preferred for simplicity and economy. Coarse particles may be removed by filtration or centrifugation if desired although additional separations or removal of large sized particles is generally believed to be, in embodiments, unnecessary.

When using submicron resin particles, no micronization step is required to form a stable colloid. A micronization step may however, be used with a submicron resin if smaller submicron particles are desired.

When a micronization step is selected, grinding or milling time is greatly reduced due to the friable nature of the nanomagnetic nanocomposite. According to the present invention, submicron particles may be produced by growing or building from the molecular level rather than grinding larger particles down to form smaller particles. Thus, in embodiments, the ionic polymeric matrix can be formed using known submicron particle size polymerization techniques followed by in situ impregnation or formation of the magnetic nanocrystalline particles with the resulting submicron sized polymer matrix.

In exemplary examples of submicron resins, diafiltration techniques can be used in place of conventional ion exchange techniques to process the resin because of the very small size of the resin beads. The submicron resin beads may be suspended in an aqueous colloidal form prior to incorporation of the precursor metal ions, thus resulting in a stable colloidal dispersion of the resin and magnetic nanocrystalline particles subsequent to appropriate chemical treatment to convert the ionically associated metal ion species to the desired magnetic species. The nanomagnetically impregnated resin beads may be removed from the dispersed or colloidal condition and dried to form a dry nanomagnetic nanocomposite if desired for added convenience shipping, storing, and subsequent handling, for example, dispersing and gelling the nanocomposite in alcoholic media.

Ultrafiltration is a known pressure-activated membrane filtration process capable of performing a variety of selective molecular separations. For a discussion of this technology see Breslau, B. R., "Ultrafiltration, Theory and Practice," paper presented at the 1982 Corn Refiners Association Scientific Conference, Lincolnshire, Ill., Jun 16–18, 1982, which is incorporated herein by reference in its entirety. In ultrafiltration, the process fluid flows across a membrane with pore diameters in the range of 10 to 200 Angstroms. Solvents and species whose molecular size and weight are below the molecular weight cut-off will permeate through the membrane and emerge as an ultrafiltrate, while rejected species are progressively concentrated in the retentate process stream. Ultrafiltration differs from reverse osmosis in that it employs a more "porous" membrane which will not retain low molecular weight species such as solvent molecules, rather the membrane separation application is based on particle size. Ultrafiltration covers the particle diameter range of $10^{-3}$ to $10^2$ microns. Alternatively, the resin selected may be submicron in size, for example, less than about 1 micron, from about 0.01 to about 1.0 micron, and preferably from about 0.05 to about 0.5 microns, so that no additional micronization step is necessary. Examples of such a matrix include a submicron sulfonated polystyrene resin, designated SSPR for the purposes of the present invention, available from Rohm & Haas in emulsion form. Additional submicron resins appropriate for use in the present invention include any submicron resins which accomplish the objects of the present invention and which do not interfere with the characteristics of the desired material properties disclosed herein.

The following examples are illustrative of the invention embodied herein. All amounts are by weight percent unless specified otherwise.

EXAMPLE I

Preparation of Nanomagnetic Composition. A nanocomposite containing 57 percent by weight gamma $Fe_2O_3$ in a 4 weight percent cross-linked sulfonated polystyrene ion exchange resin was prepared in accordance with, for example, the aforementioned U.S. Pat. No. 4,474,866, the disclosure of which is incorporated by reference herein in its entirety. A methanol based ferrofluid was then prepared from the nanocomposite and micronized before use as follows. Two grams of the starting nanocomposite were placed in a 4 ounce, wide mouth jar (4.5 cm O.D.) with 300 grams of ¼ inch 440 stainless steel shot. The contents of the jar were roll milled for 120 hours in the dry state and then again for 16 hours after the addition of 40 mL of methanol. The resulting fluid was centrifuged at 8,500 g for four 15 minute intervals. The fluid was then concentrated to 10 mL by ultrafiltration in an AMICON 8200 stirred cell under 36 psi of nitrogen using a cellulose membrane with an average pore size of 40 nanometers. Chemical and spectroscopic analysis of the ferrofluid showed 8.8 percent by weight solids and 2.1 weight percent iron. Transmission electron microscopy (TEM) of the evaporated ferrofluid with selected area electron diffraction showed no change in the size, shape, or composition of the particles from those of the starting material. The micrograph showed islands of dried ferrofluid containing polymer and clusters of gamma-$Fe_2O_3$ nanocrystals ranging in size up to about 10 nanometers. The methanolic ferrofluid exhibited thixotropic behavior: upon standing the ferrofluid slowly gels and then undergoes reversible liquefaction upon shaking. The free magnet composite could be obtained by starting with either the liquid or the gel form.

Figure 1B:
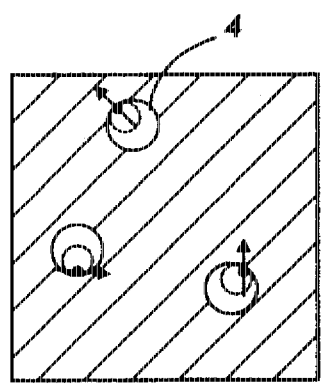
FIG. 1b is a schematic illustration of the formation and magnetic behavior of randomly oriented, rotationally free, single domain nanomagnetic composites of the present invention formed upon solidifying the surrounding media or continuous matrix in the absence of an external field.
Figure 1C:
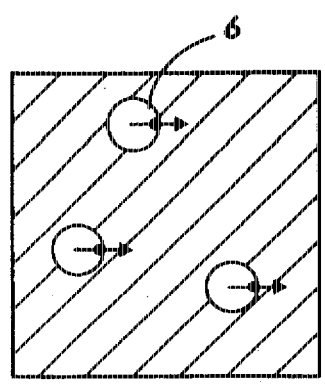
FIG. 1c is a schematic illustration of highly oriented and non interacting magnetic behavior of the rotationally free, single domain magnetic nanocomposites of the present invention in the presence of an external electomagnetic field.

With reference to the Figures, FIGS. 1a to 1c illustrate different particle-matrix coupled states which could account for the observed magnetic properties of the nanomagnetic compositions of the present invention. FIG. 1a is a schematic of magnetic dipoles (reference numeral 2) randomly oriented in a continuous liquid or solid matrix (reference numeral 1) in the absence of a magnetic field, and which phenomena is well known. FIG. 1a illustrates the most typical or expected state, wherein the magnetic particles are entirely encapsulated by a continuous matrix with large direct surface interfacial coupling. FIG. 1b illustrates the formation upon cooling and random magnetic orientation of the rotationally free single domain nanomagnets of the present invention in the absence of an external field. In FIG. 1b, the particles are confined in cavities 4 where interfacial coupling is much smaller and possibly at a minimum. For a matrix that undergoes contraction upon cooling, a cavitated matrix may be expected. FIG. 1c illustrates the compartmentalized and independently oriented magnetic, that is noninteracting, behavior of the rotationally free, single domain nanomagnetic particles 6 of the present invention in the presence of an external field.

Figure 2:
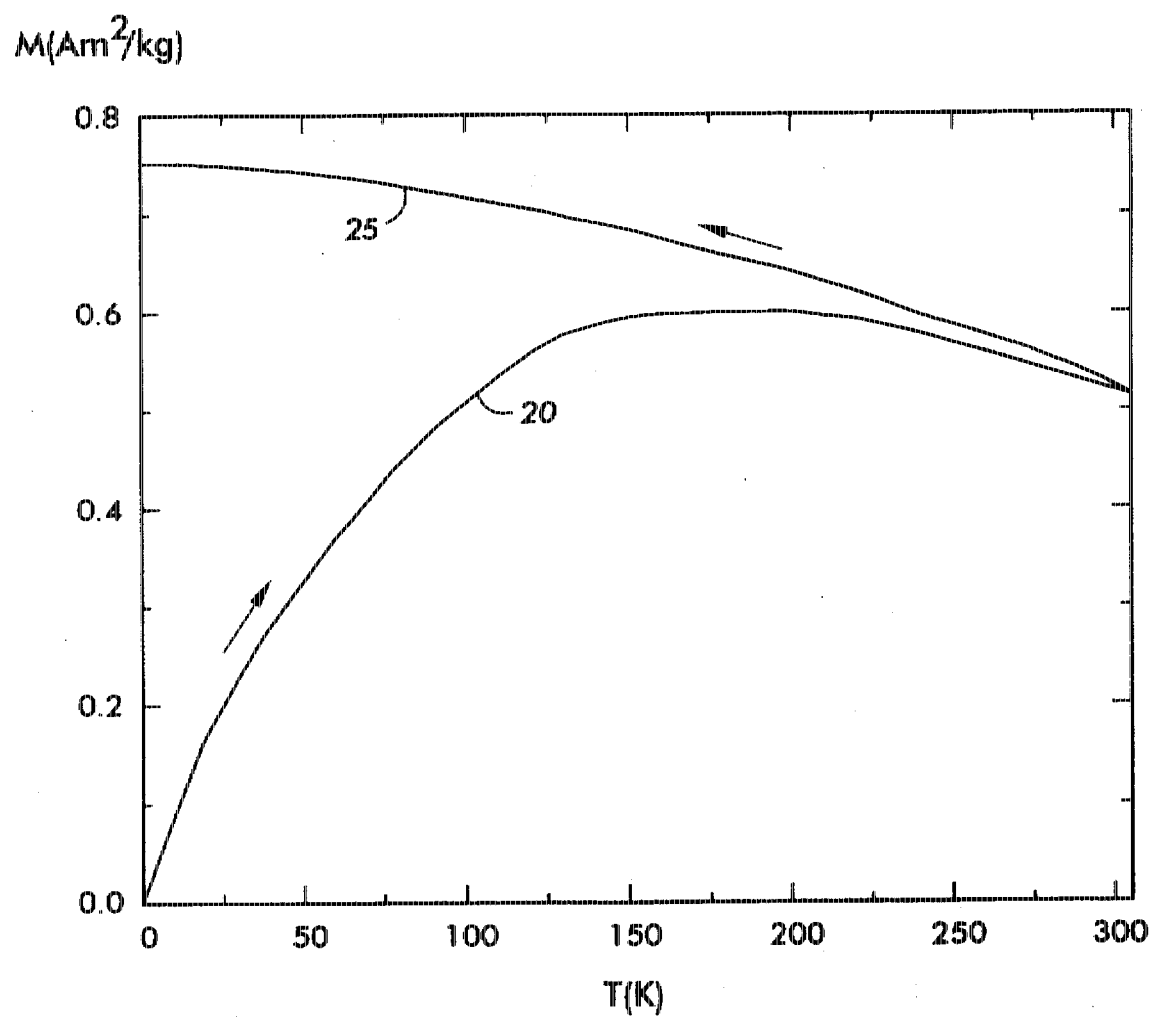
FIG. 2 illustrates exemplary magnetization versus temperature curves for the field cooled (FC) and zero field cooled (ZFC) for a nanomagnetic composition of the present invention in an applied field.

FIG. 2 illustrates, in embodiments, exemplary magnetization versus temperature curves for field cooled (FC) and zero field cooled (ZFC) measurements for a nanomagnet composition of the present invention in an applied field of about 7.96 kA/m. Magnetic characterization of this and other nanomagnetic compositions was accomplished using a SHE-SQUID magnetometer with a KEVLAR sample holder. Low field magnetization versus temperature measurements of a magnetic composition of the present invention, for the zero field cooled (ZFC) 20 and field cooled (FC) 25 measurements, indicated the existence of irreversibility phenomena associated with metastable magnetic states. Similar behavior was observed for the nanocrystalline gamma-$Fe_2O_3$ in the solid polymer. A broad peak in the ZFC curve is believed to be attributable to the broad distribution of energy barriers and relaxation times of the magnetic moments while the maximum in the ZFC data at $T_b=160°$ K corresponds to the blocking of the random orientations of the anisetropy direction of each particle. The irreversibility between the ZFC and FC curves begins at a temperature above the $T_b$.

Figure 3:
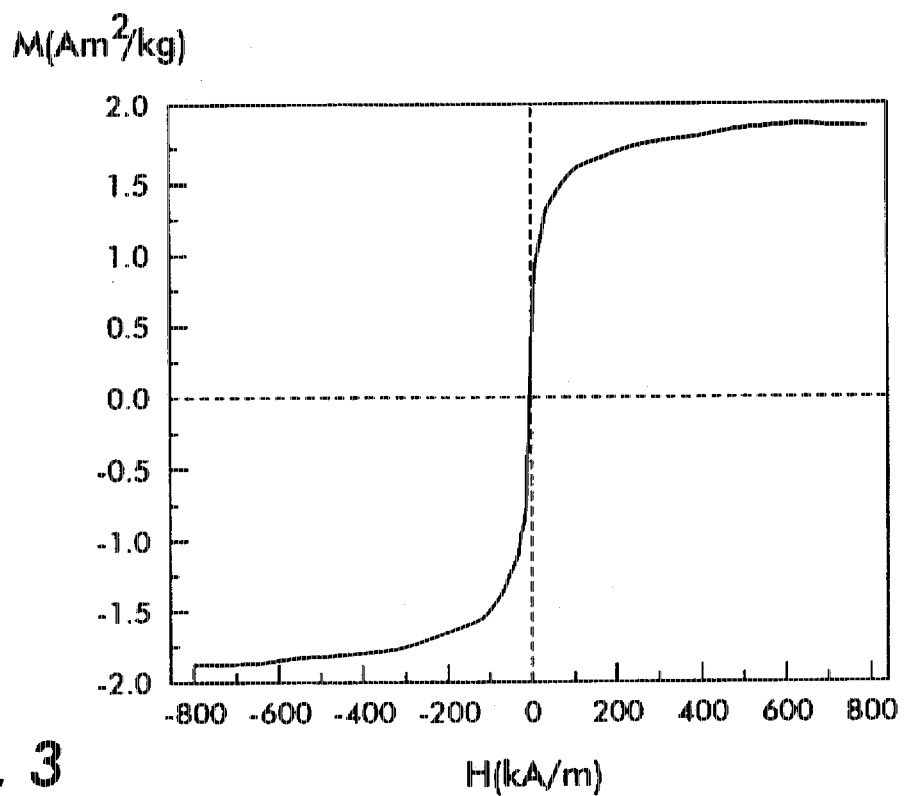
FIG. 3 illustrates exemplary isothermal magnetization versus magnetic field relationship for a nanomagnetic composition of the present invention in a applied magnetic field range.

FIG. 3 illustrates, in embodiments, illustrates exemplary isothermal magnetization versus magnetic field relationship for a nanomagnet composition of the present invention in an applied field of between about −796 and about 796 kA/m at about 290° K.

Figure 4:
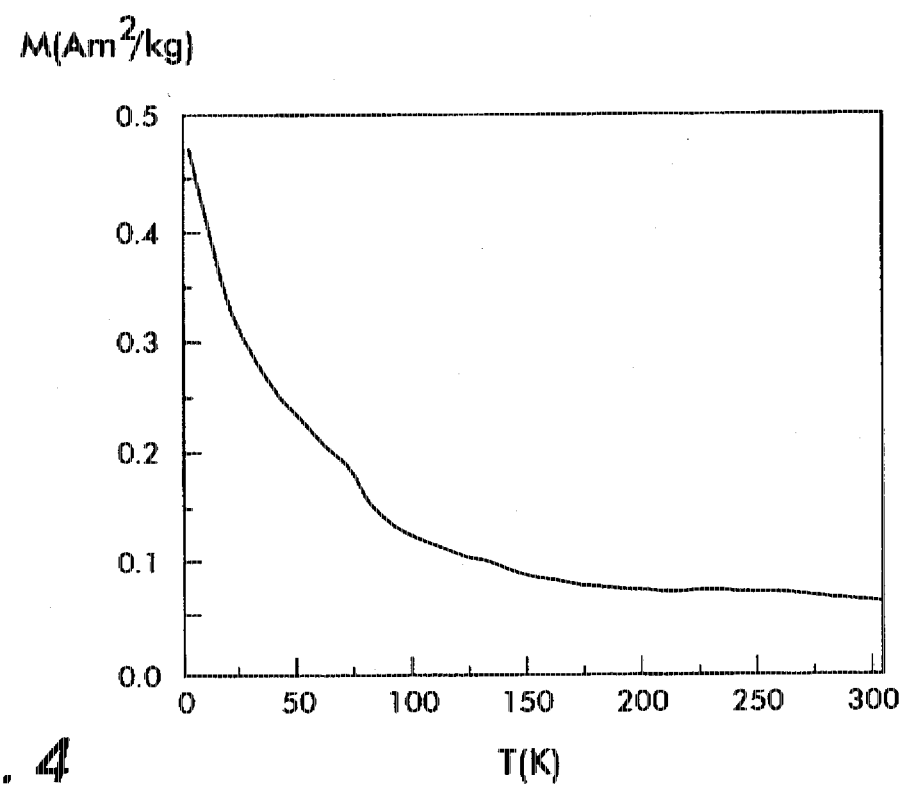
FIG. 4 illustrates exemplary magnetization versus temperature relation for a free magnet nanocomposite of the present invention.

FIG. 4 illustrates, in embodiments, an exemplary magnetization versus temperature relation for a free magnet nanocomposite of the present invention at about 1.59 kA/m following step 4), reference FIG. 6a and below.

Figure 5:
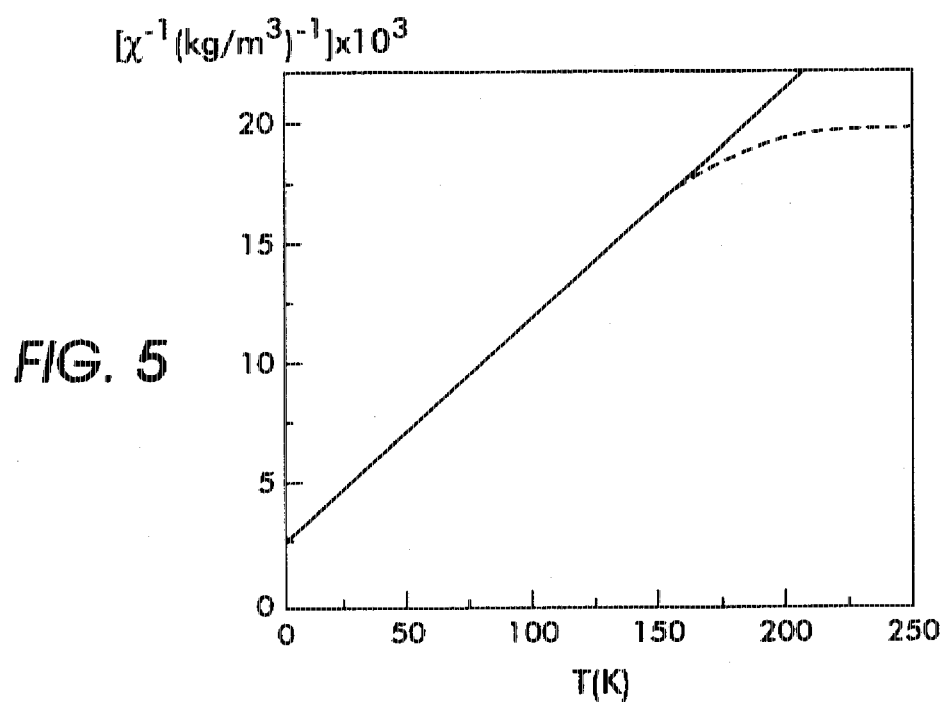
FIG. 5 illustrates exemplary magnetic susceptibility and Curie-Weiss behavior for a nanocomposite of the present invention.

FIG. 5 illustrates, in embodiments, exemplary magnetic susceptibility for a nanocomposite of the present invention and supports the aforementioned Curie-Weiss behavior.

Figure 6A:
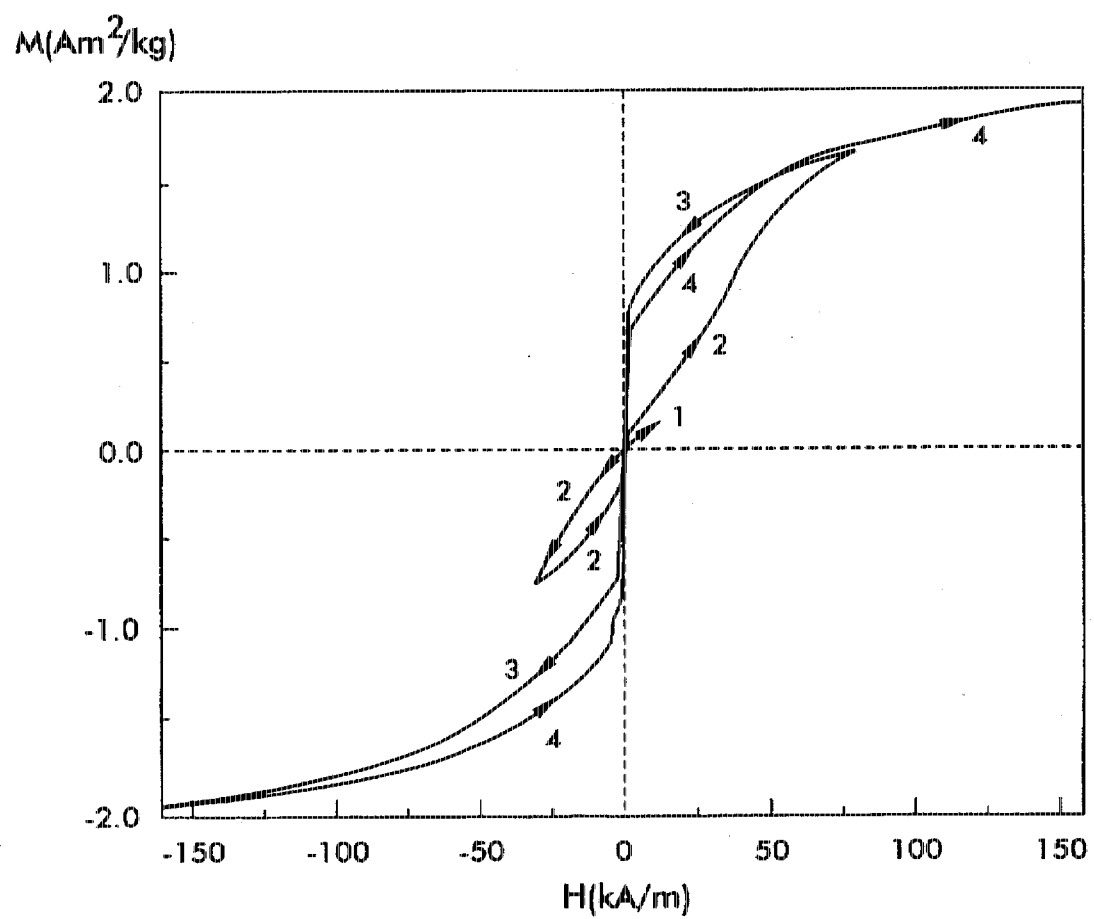
FIG. 6a illustrates an exemplary magnetization versus applied magnetic field relation for a nanomagnetic composition of the present invention with repeated variation of the applied magnetic field.

FIG. 6a illustrates, in embodiments, an exemplary magnetization versus magnetic field relationship for a nanomagnetic composition of the present invention recorded at about 4.2° K in a magnetic field of between about −150 and about 150 kA/m. The steps are indicated by the corresponding reference numerals and are as follows: step 1) H=0.0 to 7.96 to 0.0 to −7.96; step 2) H=−7.96 to −31.8 to 0.0 to 79.9; step 3) H=79.6 to 0.0 to 159.2; and step 4) H=−159.2 to 0.0 to 159.2 kA/m.

Figure 6B:
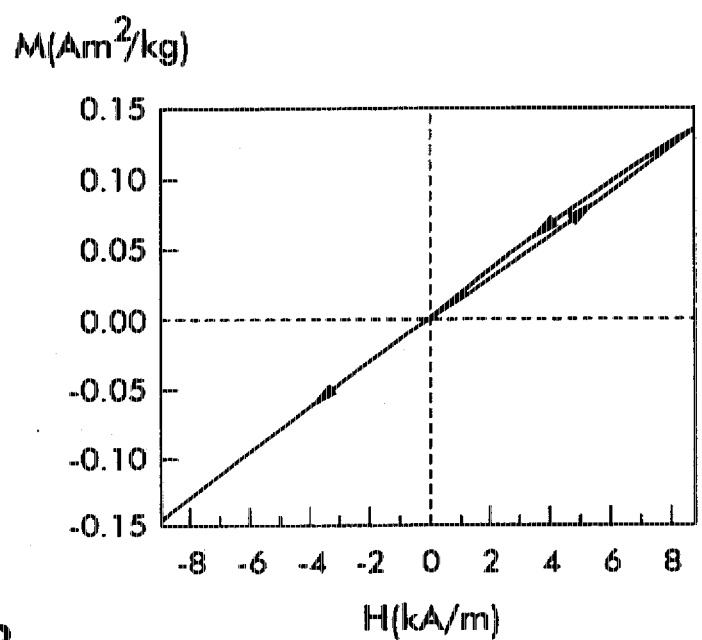
FIG. 6b illustrates the magnetization versus applied magnetic field relation for the nanomagnetic composition shown in FIG. 6a obtained in step 1 of a magnetization analysis.

FIG. 6b illustrates the magnetization versus applied magnetic field relation for the nanomagnetic composition shown in FIG. 6a obtained in step 1. The magnetization at H=7.96 kA/m, approximately 0.13 $Am^2$/kg, indicates that the particles are matrix coupled in the initial solid or frozen state.

Figure 6C:
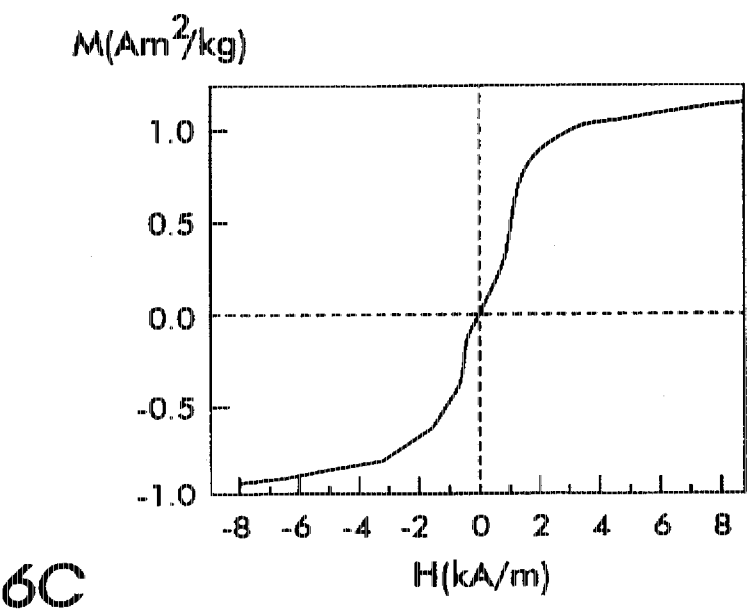
FIG. 6c illustrates the magnetization versus applied magnetic field relation for the nanomagnetic composition shown in FIG. 6a obtained in step 4 of a magnetization analysis.

FIG. 6c illustrates the magnetization versus applied magnetic field relation for the nanomagnetic composition shown in FIG. 6a obtained in step 4. The magnetization appears to follow the Langevin function; saturation was reached at a field strength of about H=3.2 kA/m; the magnetization at about H=7.96 kA/m, approximately 1.12 $Am^2$/kg, is much larger than that obtained in step 1 with the same field, which indicates that the particles are free to rotate physically.

At room temperatures, for example about 25° C., the material exhibits superparamagnetic properties consistent with the presence of nanoscale particles. The isothermal variation of the magnetization with the magnetic field (H) at about 290° K demonstrates the absence of remanence and coercivity characteristics of superparamagnetic behavior at this temperature. Below $T_b$, the sample shows characteristic hysteresis in the magnetization versus the magnetic field curves. These data are consistent with nano-scale particles physically or chemically attached to the ion exchange matrix.

The aforementioned sample used in the magnetic characterization was then cooled in a zero applied field to about 6° K and subjected to a magnetic field larger than 0.5 Tesla. Magnetic characterizations of the system were then carried out using both low and high magnetic fields. The M (H) curve was recorded at about 6° K for the nanocomposite after the applied magnetic field treatment. The data indicate sequentially the way in which the field was varied. Though the sample is at temperature well below the blocking temperature, there is no coercivity. There is, however, a remanence magnetization which changes its sign after applying a very small negative field. This suggests that the irreversibly observed in the M (H) curves is due purely to the random directions of the magnetic moments of the particles in the polymer matrix which depend on the magnetic history of the sample. Very small fields produced a full reversal of the total magnetic moment of the system, which suggests that the nanoparticulate is virtually free and unencumbered to rotate in a presumably cavitied or cavitated environment. This assumption was further tested by doing low field magnetization measurements on the sample.

The magnetization versus temperature plot for a cavitated, or in the alternative, particle-matrix decoupled sample, in an applied field of about 0.002 T is dramatically and unexpectedly changed from that observed for the same sample prior to exposure to a magnetic field. The new dependence of the field treated sample is typical of that for a paramagnetic system showing Curie or Curie-Weiss behavior. The data collectively indicate that there are no barriers to the orientation of the magnetic moments of the particles along the applied magnetic field. Since the anisotropy constant of the particles can not be zero, although not wanting to be limited by theory, an interpretation of the dependence is that each particle with its own magnetic moment rotates freely in the matrix in an applied magnetic field. Particle rotation in an applied field is observed in ferrofluids but is damped by the viscosity of the liquid matrix. In the present invention, wherein the nanomagnetic composition is a solid or highly viscous gel, viscosity effects are negligible. At least at low temperatures, the nanomagnetic particles in the free magnet composite appear to be in a virtual partial vacuum. The magnetic compositions of the present invention exhibit a nearly linear dependence of inverse magnetic susceptibility versus temperature, reference FIG. 5, up to about 150° K and is close to the Curie-Weiss behavior observed for free spin systems. In the superparamagnetic regime beyond the plateau appearing between 175° and 250° K, this behavior is also observed because the thermal energy is larger than the barriers against the change of direction of the magnetic moments. Although the system is well below the blocking temperature, paramagnetic behavior is still observed. The value of the Curie-Weiss temperature, that is the intersection of the extrapolated data ($\chi^{-1}$) FIG. 5 is non zero and may be indicative of: frictional interactions between the nanomagnetic particle and the matrix, a small population of matrix coupled particles, the occupancy of more than one particle per cavity, and possible residual magnetic dipolar interaction between the particles.

In a preliminary and nonlimiting comparative example, when a nanocomposite was prepared under identical conditions as a methanol based nanomagnetic composite with the exception that water was used as the liquid dispersion media, no free magnet properties were observed upon cooling and exposing the sample to the same magnetic field conditions. Although not wanting to be limited by theory, it is believed that the magnetic composite in the solid $H_2O$ phase is sufficiently a highly hydrogen bonded to prevent the formation of the freely rotating magnetic species.

When a cooled methanol based nanomagnetic sample represented by FIG. 1b is subjected to magnetic field treatment, the particle-matrix interface is apparently decoupled to give various states which are magnetically field dependent to different degrees, for example, only upon gravity, weak magnetic fields greater than gravity, and weak magnetic field but insufficient to overcome the force of gravity.

In embodiments, when the methanol based nanomagnetic composite is warmed to above about 200° K the free magnet properties are lost. Upon cooling the sample to below about 200 K, with subsequent magnetic field treatment, the previously observed free magnet properties are restored. Thus, the nanomagnets rotate freely as long as the composite is maintained at below about 200° K. Nanomagnetic composites with particle matrix transitions above about 300 K were also examined with the result that similar or identical behavior was observed.

In the rotationally free nanomagnetic material of the present invention, the magnetic moment of a free particle can not tunnel between two orientations since this would violate conservation of the total angular momentum. No hysteresis is expected in a system of rotationally free particles because the particles rotate physically in response to field variations.

In embodiments, at least two principal advantages of the free magnetic systems of the present invention are: the high initial permeability, which is comparable or superior to that of extremely soft ferromagnetic materials; and the absence of time dependent phenomena subsequent to a field variation. Known magnetic materials typically exhibit quantum tunneling of magnetization at low temperatures, typically below 10° K, and especially below 2° K, and Neel relaxation at higher temperatures, typically at greater than 10° K, and especially above about 100° K ,when the magnetic field is changed which behavior does not appear to be present in the compositions of the present invention.

In addition to the direct current (dc) magnetic data, alternating current (ac) magnetic measurements and Mossbauer spectroscopic data were obtained for nanomagnetic composites of the present invention and indicated freely rotating nanoscopic iron oxide particles.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A magnetic composition comprising nanocomposite particles comprising from about 0.001 to about 60 weight percent of magnetic nanocrystalline particles selected from the group consisting of metal oxides, elemental metals and mixtures thereof, wherein the magnetic nanocrystalline particles are from about 0.0001 to about 0.1 microns in diameter and wherein the said particles are dispersed in from about 40 to about 99.999 weight percent of a discrete phase matrix selected from the group consisting of ion exchange resins, ion exchange metal oxides and mixtures thereof and continuous phase matrix selected from the group consisting of a solid, a rigid foam and a gel, wherein the discrete phase resides in the interstices within the continuous phase matrix.

2. A magnetic composition in accordance with claim 1 wherein the magnetic nanocrystalline particles are magnetically rotationally free and single domain in character.

3. A magnetic composition in accordance with claim 1 wherein the magnetic nanocrystalline particles are free of magnetic memory.

4. A magnetic composition in accordance with claim 1 wherein the continuous phase matrix is comprised of an alcohol or mixture of alcohols with from 1 to about 5 carbon atoms and which phase is at a temperature at or below the freezing point of the alcohol.

5. A magnetic composition in accordance with claim 1 wherein the continuous phase matrix is a gel comprised of a mixture of a glycol and hydrophilic fumed metal oxide particles.

6. A magnetic composition in accordance with claim 1 wherein the continuous phase matrix is an alkyl acrylate polymer.

7. A magnetic composition in accordance with claim 1 wherein the continuous phase matrix is a liquid gelled acrylic polymer.

8. A magnetic composition in accordance with claim 1 wherein the interstices are a void or voids of from about 0.001 to about 1.0 micron in diameter.

9. A magnetic composition in accordance with claim 1 wherein the interstices are a void or voids of from about 0.005 to about 0.1 microns in diameter.

10. A magnetic composition in accordance with claim 1 wherein the interstices are a void or voids of from about 0.005 to about 0.05 microns in diameter.

11. A magnetic composition in accordance with claim 1 wherein the composition is free of magnetic interaction between individual magnetic nanocrystalline particles, and individual discrete phase matrix particles.

12. A magnetic composition in accordance with claim 1 wherein the composition is free of barriers to a change in system magnetization(M).

13. A magnetic composition in accordance with claim 1 wherein the magnetic response of the composition becomes infinite up to about the saturation magnetization of the composition upon application of a magnetic field (H) of from about $10^{-8}$ to about 10 Tesla.

14. A magnetic composition in accordance with claim 1 wherein the initial magnetic saturation is from about 0.01 emu per gram to about the bulk saturation magnetization of the composition.

15. A magnetic composition in accordance with claim 1 wherein the composition has a magnetic saturation moment of from about 0.1 to about 30 emu per gram.

16. A magnetic composition in accordance with claim 1 wherein the composition is superparamagnetic at about 4°

K. to about 500° K. and is substantially instantaneously responsive to a magnetic field.

17. A magnetic composition in accordance with claim 1 wherein the magnetic nanocrystalline particles are formed from magnetic metal ions selected from the group consisting of transition metal elements, a lanthanide series element, and mixtures thereof.

18. A magnetic composition in accordance with claim 1 wherein the magnetic nanocrystalline particles are gamma phase iron oxide particles of from about 10 nanometers to about 0.1 microns in diameter and are uniformly dispersed in the discrete phase.

19. A magnetic composition in accordance with claim 1 wherein the composition has an initial magnetic permeability of greater than about 1.0.

20. A magnetic composition in accordance with claim 1 wherein the composition has an initial magnetic permeability of from about 1.1 to about $10^7$.

21. A magnetic composition in accordance with claim 1 wherein the composition is electrically nonconductive.

22. A magnetic composition in accordance with claim 1 wherein the composition is free of quantum tunneling of magnetization above 0° K.

23. A magnetic composition in accordance with claim 1 further comprising magnetic nanoparticulate particles selected from the group consisting of ferromagnetic materials, ferrimagnetic materials, and mixtures thereof.

24. A magnetic composition in accordance with claim 1 wherein the nanocrystalline particles contained in the discrete phase are physically separated from the walls of the interstices formed by the continuous phase matrix.

25. A magnetic composition in accordance with claim 1 wherein the nanocomposite particles comprise from about 0.01 to about 40 weight percent of magnetic nanocrystalline particles dispersed in from about 50 to about 90 weight percent of the discrete phase matrix.

* * * * *